No. 651,115. Patented June 5, 1900.
M. MORAN.
MACHINE FOR DELINTING COTTON SEED.
(Application filed Sept. 22, 1899.)
(No Model.) 2 Sheets—Sheet 1.
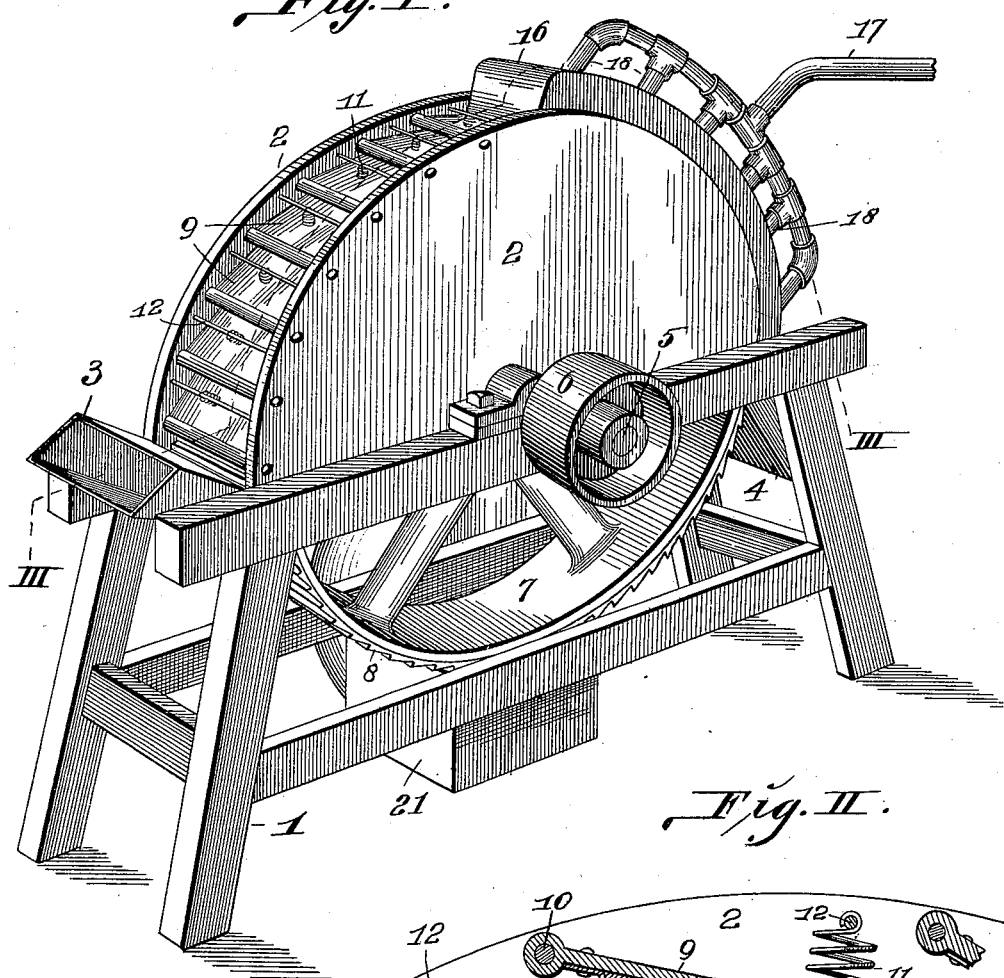
Fig. I.
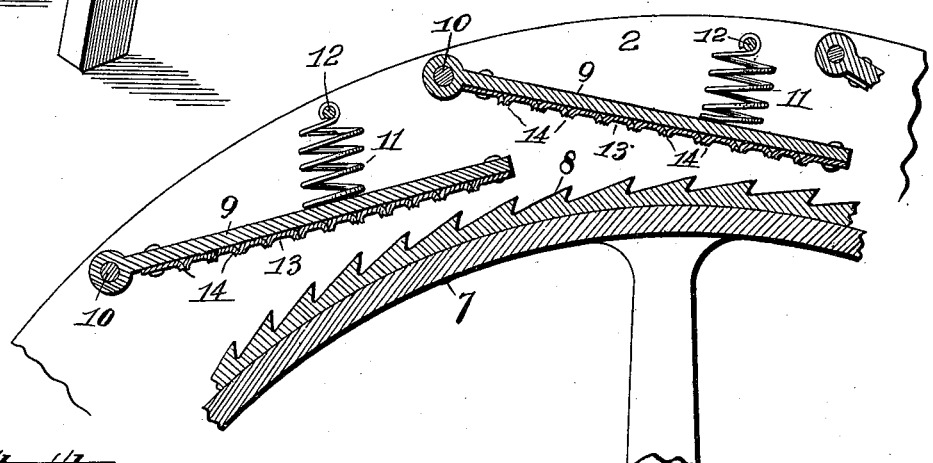
Fig. II.
Inventor:—
Michael Moran:—

No. 651,115. Patented June 5, 1900.
M. MORAN.
MACHINE FOR DELINTING COTTON SEED.
(Application filed Sept. 22, 1899.)
(No Model.) 2 Sheets—Sheet 2.
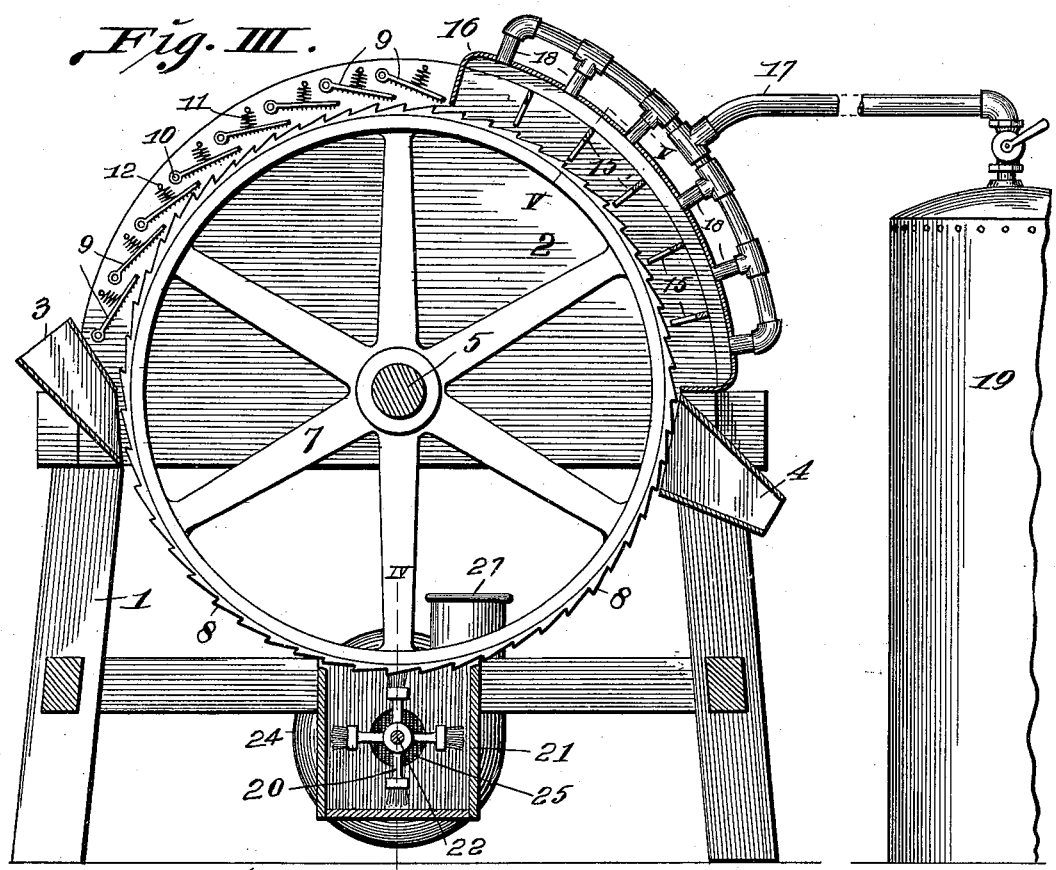
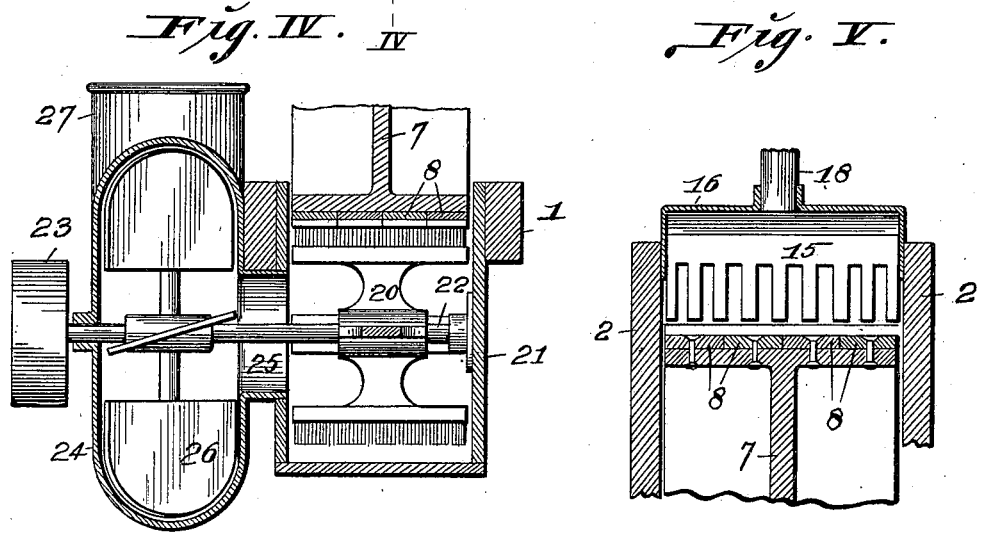
Inventor:—
Michael Moran:—
By Knight Bro attys

UNITED STATES PATENT OFFICE.

MICHAEL MORAN, OF ST. LOUIS, MISSOURI, ASSIGNOR OF ONE-HALF TO EDWARD A. ROEGNER, OF SAME PLACE.

MACHINE FOR DELINTING COTTON-SEED.

SPECIFICATION forming part of Letters Patent No. 651,115, dated June 5, 1900.

Application filed September 22, 1899. Serial No. 731,253. (No model.)

*To all whom it may concern:*

Be it known that I, MICHAEL MORAN, a citizen of the United States, residing at the city of St. Louis, in the State of Missouri, have invented certain new and useful Improvements in Machines for Delinting Cotton-Seed, of which the following is a full, clear, and exact description, reference being had to the accompanying drawings, forming part of this specification.

My invention relates to a machine for use in removing the lint from cotton-seed.

The invention consists in features of novelty hereinafter fully described, and pointed out in the claims.

Figure I is a perspective view of my improved machine. Fig. II is an enlarged sectional view taken through the toothed carrier-wheel and the spring-controlled lint-removing plates. Fig. III is a vertical sectional view taken approximately on the line III III, Fig. I. Fig. IV is an enlarged sectional view taken on the line IV IV, Fig. III. Fig. V is an enlarged sectional view taken on the line V V, Fig. III.

1 designates the frame of the machine, on which housing-walls 2 are mounted.

3 is a feed-hopper mounted between the walls 2 at one end of the machine, and 4 is a discharge-spout located at the opposite end of the machine.

Mounted in bearings on the frame 1 is a shaft 5, provided with a drive-pulley 6. On the shaft 5 is a wheel 7, provided on its circumference with a series of toothed bands 8. These bands are preferably secured to the rim of the wheel by means of rivets, as illustrated in Fig. V. The teeth of the bands are angular in shape, similar to saw-teeth, and all project in like direction.

9 designates plates mounted on cross-rods 10, secured in the housing-walls 2, said rods constituting hinges on which the plates may be swung. The plates 9 are controlled by springs 11, that bear thereagainst and are connected to transverse rods 12, seated in the housing-walls. Each hinged plate 9 has secured to its under side a sheet-metal facing-plate 13, provided with protuberances 14, formed by punching a portion of the plate outwardly from one side thereof, thereby producing a roughened edge to the protuberance.

The cotton-seed to be delinted is fed into the machine at the hopper 3, and the toothed carrier-wheel 7 being revolved in the direction of the arrow, Fig. III, carries the said seed upwardly beneath the plates 9, in which movement the seed is brought into contact with the protuberances 14 of the facing-plates 13, owing to said facing-plates being held close to the circumference of the carrier-wheel. The roughened protuberances act upon the seed in its travel to pull the lint therefrom, gathering the lint until such time as the protuberances have become clogged by a considerable collection of lint, when the lint is dragged therefrom in the travel of the seed.

15 designates combs fixed to the housing-walls 2 and adapted to retard the movement of the seed in order that it may receive sufficient contact with the lint-removing wheel 7 to result in the lint being efficiently removed from the seed.

16 designates an air-box to which an air-conducting pipe 17 leads through branch pipes 18. The pipe 17 may lead from any suitable source of compressed-air supply, such as a reservoir 19, (see Fig. III,) from which compressed air may be conveyed through the pipe 17 and its branches 18 into the air-box 16 to effect a pressure against the seed as it passes the combs 15, thereby holding the seed against the periphery of the carrier-wheel instead of its being permitted to be thrown away from said wheel by centrifugal motion in the rapid revolutions of the wheel. As the seed reaches the outlet-spout 4 it passes from the machine therethrough, while the lint is conveyed with the wheel by adhering to the teeth of the bands 8.

20 designates a rotary brush located in a housing 21 and mounted upon a shaft 22, provided with a drive-pulley 23, that receives power from the shaft 5 through the connection of a belt leading to a pulley on said last-named shaft, located at the opposite end thereof from that upon which the pulley 6 is mounted. The pulley 23 is of less diameter than the pulley on the shaft 5, with which its driving-belt connects, such arrangement being provided for the purpose of acquiring a more rapid rotation of the shaft 22 than that of the shaft 5.

24 designates a fan-housing located beside the brush-housing 21 and having an eye communicating with said brush-housing. In this fan-housing is a fan 26, mounted on the shaft 22. The fan-housing 24 is provided with an outlet 27.

In the revolutions of the carrier-wheel 7 the lint is carried therewith, as explained, after the teeth of the bands 8 pass the discharge-spout 4. The rotary brush 20 revolves in contact with the toothed bands 8, traveling at a higher rate of speed than the carrier-wheel, and acts against the toothed rims to effectually remove the lint into the brush-housing 21, from which it is collected by the fan 26, being drawn through the eye 25 and discharged from the fan-housing through the outlet 27, from which it may be conveyed to any desirable location and deposited.

I claim as my invention—

1. In a cotton-seed cleaner, the combination of a suitable frame, a wheel rotated in said frame and having upon its periphery saw-teeth having their lateral dimension extending in the direction of the wheel's axis, and with cutting edges presented in the direction of the wheel's rotation and holding-plates arranged tangentially to the wheel and formed with pockets or depressions on their inner faces by which the seed is held and retarded while the saw-tooth edges cut the lint therefrom.

2. In a cotton-seed cleaner, the combination of a suitable frame, a wheel rotated in said frame and having upon its periphery, saw-teeth having their lateral dimensions extending in the direction of the wheel's axis with cutting edges presented in the direction of the wheel's rotation, means for delivering seed to and discharging it from the wheel located approximately at opposite ends of the wheel's longitudinal diameter, and holding-plates arranged tangentially over the upper portion of the wheel and formed with pockets or depressions on their inner faces by which the said seed is held and retarded while the saw-tooth edges cut the lint therefrom.

3. In a cotton-seed cleaner, the combination of a suitable frame, a wheel rotated in said frame, and having upon its periphery, saw-teeth having their lateral dimensions in the direction of the wheel's axis, and with cutting edges presented in the direction of the wheel's rotation, and roughened holding-plates arranged tangentially over the upper portion of the wheel providing gradually-reducing passages between them and the wheel, and leaving narrow escape-passages between their free ends and the saw-teeth.

4. In a machine of the character described, the combination of a revoluble saw-toothed carrier-wheel, means for holding the material to be acted upon in contact with the periphery of said wheel, an air-receiving box arranged at the periphery of said wheel, and means for conveying a supply of air to said box, substantially as and for the purposes set forth.

5. In a machine of the character described, the combination of a toothed carrier-wheel, housing-walls, means for holding the seed operated upon to the periphery of said wheel, an air-box, and means for conveying a supply of air to said box to retain the seed operated upon against said wheel, substantially as described.

6. In a machine of the character described, the combination of a toothed wheel, housing-walls, plates provided with protuberances hinged between said walls, springs arranged to hold said plates toward the periphery of said wheel, and combs, mounted between said walls arranged to retard the movement of the seed operated upon, the boxing and means for creating a blast substantially as described.

MICHAEL MORAN.

In presence of—
E. S. KNIGHT,
M. P. SMITH.